US005224210A

United States Patent [19]

Pinedo et al.

[11] Patent Number: 5,224,210

[45] Date of Patent: Jun. 29, 1993

[54] METHOD AND APPARATUS FOR GRAPHICS PIPELINE CONTEXT SWITCHING IN A MULTI-TASKING WINDOWS SYSTEM

[75] Inventors: David Pinedo; Darel N. Emmot; Ronald D. Larson; Byron A. Alcorn, all of Fort Collins; Desi Rhoden, Boulder, all of Colo.

[73] Assignee: Hewlett-Packard Company, Palo Alto, Calif.

[21] Appl. No.: 900,535

[22] Filed: Jun. 18, 1992

Related U.S. Application Data

[63] Continuation of Ser. No. 387,510, Jul. 28, 1989.

[51] Int. Cl.[5] .............................................. G06F 15/20

[52] U.S. Cl. .................................... 395/164; 395/162; 395/163

[58] Field of Search ................................ 395/162–164

[56] References Cited

U.S. PATENT DOCUMENTS

| | | | |
|---|---|---|---|
| 4,847,755 | 7/1989 | Morrison et al. | 395/650 |
| 4,903,218 | 2/1990 | Longo et al. | 395/163 |
| 4,970,636 | 11/1990 | Snodgrass et al. | 395/134 |

*Primary Examiner*—Dale M. Shaw
*Assistant Examiner*—Kee M. Tung
*Attorney, Agent, or Firm*—Guy J. Kelley

[57] ABSTRACT

Graphics window systems which utilize graphics pipelines and graphics pipeline bypass buses. Hardware solutions for window relative rendering of graphics primitives, block moving of graphics primitives, transfer of large data blocks, and elimination of pipeline flushing are disclosed. The hardware implementations provided in accordance with the invention are interfaced along the pipeline bypass bus, thereby eliminating gross overhead processor time for the graphics pipeline and reducing pipeline latency. Methods and apparatus provided in accordance with the invention exhibit significant pipeline efficiency and reductions in time to render graphics primitives to the screen system.

16 Claims, 8 Drawing Sheets

METHOD AND APPARATUS FOR GRAPHICS PIPELINE CONTEXT SWITCHING IN A MULTI-TASKING WINDOWS SYSTEM

This is a continuation of application Ser. No. 387,510, filed Jul. 28, 1989.

FIELD OF THE INVENTION

This invention relates to computer workstation window systems. More specifically, this invention relates to method and apparatus for accelerating graphics primitive rendering on multitasking workstations that utilize graphics pipelines.

BACKGROUND OF THE INVENTION

Computer workstations provide system users with powerful tools to support a number of functions. An example of one of the more useful functions which workstations provide is the ability to perform highly detailed graphics simulations for a variety of applications. Graphics simulations are particularly useful for engineers and designers performing computer aided design (CAD) and computer aided management (CAM) tasks.

Modern workstations having graphics capabilities utilize "window" systems to accomplish graphics manipulations. An emerging standard for graphics window systems is the "X" window system developed at the Massachusetts Institute of Technology. The X window system is described in K. Akeley and T. Jermoluk, "High-Performance Polygon Rendering", *Computer Graphics*, 239-246, (August 1988). Modern window systems in graphics workstations must provide high-performance, multiple windows yet maintain a high degree of user interactivity with the workstation. Previously, software solutions for providing increased user interactivity with the window system have been implemented in graphics workstations. However, software solutions which increase user interactivity with the system tend to increase processor work time, thereby increasing the time in which graphics renderings to the screen in the workstation may be accomplished.

A primary function of window systems in graphics workstations is to provide the user with simultaneous access to multiple processes on the workstation. However, each of these processes provides an interface to the user through its own area onto the workstation display. The overall result is an increase in user productivity since the user can manage more than one task at a time with multiple windows. However, each process associated with a window views the workstation resources as if it were the sole owner. Thus, resources such as the processing unit, memory, peripherals and graphics hardware must be shared between these processes in a manner which prevents interprocess conflicts on the workstation.

Graphics workstations generally utilize graphics "pipelines" which interconnect the various components of the system. A graphics pipeline is a series of data processing elements which communicate graphics commands through the graphics system. Today, graphics pipelines and window systems are evolving to support multitasking workstations.

The typical graphics pipeline interconnects a "host" processor to the graphics system which provides the various graphics commands available to the system and which also interfaces with the user. The host processor is interfaced through the graphics pipeline to a "transform engine" which generally comprises a number of parallel floating point processors. The transform engine performs a multitude of system tasks including context management, matrix transformation calculations, light modeling and radiosity computations, and control of vector and polygon rendering hardware.

In graphics systems, some scheme must be implemented to "render" or draw graphics primitives to the system screen. A "graphics primitive" is a basic component of a graphics picture such as, for example, a polygon or vector. All graphics pictures are formed from combinations of these graphics primitives. Many schemes may be utilized to perform graphics primitives rendering. One such scheme is the "spline tessellation" scheme utilized in the TURBO SRX graphics systems provided by the Hewlett-Packard Company Graphics Technology Division, Fort Collins, Col. Regardless of the type of graphics rendering scheme utilized by the graphics workstation, the transform engine is essential in managing graphics rendering.

A graphics "frame buffer" is interfaced further down the pipeline from the host processor and transform engine in the graphics window system. A "frame buffer" generally comprises a plurality of video random access memory (VRAM) computer chips which store information concerning pixel activation on the display corresponding to the particular graphics primitives which will be rendered to the screen. Generally, the frame buffer contains all of the data graphics information which will be written onto the windows, and stores this information until the graphics system is prepared to render this information to the workstation's screen. The frame buffer is generally dynamic and is periodically refreshed until the information stored on it is rendered to the screen. The host and frame buffer have associated bandwidths. The bandwidth is a measure of the rate of data flow over a data path.

In order to accelerate multiple processes in a graphics system, the graphics pipeline must be capable of handling multiple "contexts." A graphics context consists of the current set of attributes, matrix stack, light sources, shading control, spline basis matrices, and other hardware state information. Previous graphics systems were generally only able to support a single graphics context at a time and required the host's software to perform all of the context switching. In these systems, software context switching requires the host to store the context for each active process in virtual memory, write the context to the device when the process is active, and read the context back in the system. This process is extremely time consuming and inefficient, and does not adequately support high level graphics operations in the graphics system.

Several problems exist in state of the art graphics window systems utilizing graphics pipelines. A significant known difficulty arises when multiple contexts must be switched through the pipeline. Whenever a window context must be changed or "switched" through the graphics pipeline, the pipeline must be "flushed." Flushing requires that the pipeline be emptied of data to determine if all of the data corresponding to the previous context has passed through the pipeline to the frame buffer.

There are problems attendant in this method of context switching. Since all the data must be emptied from the pipeline to determine if the previous context has passed through to the frame buffer before the next context can be input to the pipeline from the host, severe limitations in rendering graphics primitives to the screen in a timely fashion are introduced and the system is significantly slowed. Furthermore, host management of this kind of context switching greatly increases the host's overhead duties, thereby decreasing the host's efficiency and increasing host processor time dedicated to matters not associated with actively rendering data to the frame buffer. Thus, graphics pipeline flushing is an inadequate and inefficient method to accomplish context switching in modern window systems utilizing graphics pipelines.

Other timing problems exist in window systems utilizing graphics pipelines. All graphics pipelines experience pipeline "latency", which is defined as the time required for a single primitive to traverse the pipeline. A significant difficulty is encountered during context switching in graphics pipelines as a result of pipeline latency, since pipeline latency decreases the window system's responsiveness and user interactivity. Furthermore, complex primitives require significant processing time for rendering and therefore, force other primitives to back up in the pipeline until they are completely rendered to the screen.

Thus, window operations which theoretically should be interactive with the user oftentimes force the user to wait while graphics primitives are being rendered. Since graphics pipelines and graphics workstations are evolving to support more complex primitives and longer pipelines, pipeline latency and pipeline flushing now present prohibitive problems in the ongoing effort to increasing pipeline throughput and efficiency.

There is thus a long-felt need in the art for graphics pipeline architectures which eliminate the need for pipeline flushing and reduce pipeline latency. Additionally, there is a long-felt need in the art for pipeline graphics systems to support multiple context switching. Furthermore, a long-felt need in the art exists for graphics systems which support multiple contexts, yet reduce the need for complex host management and processor overhead. These needs have not heretofore been satisfied in the graphics window art by any current software implementations currently in use.

SUMMARY OF THE INVENTION

In accordance with the invention, there are provided a computer systems which provide for interrupting data flow between a rendering circuitry and a frame buffer while allowing data to continue to flow from a host to a transform engine and the rendering circuitry, comprising the host and a graphic subsystem having the frame buffer, a pipeline and a pipeline bypass. The system comprises a marker register means interfaced with the pipeline for tracking the progress of graphics data from the host through the pipeline to the frame buffer.

Further in accordance with the invention, there are provided a systems for eliminating a need for flushing a graphics pipeline comprising host processor means for providing graphics commands for controlling rendering of data in a frame buffer, pipeline means interfaced with the host processor means for processing data from the host processor means and communicating the data to a frame buffer, marker register means interfaced with the pipeline means for tracking data output, and pipeline bypass means bypassing the pipeline means for providing access of data to the frame buffer, thereby improving timeliness of the data passed from the host processor means to the frame buffer through the pipeline means.

Methods of tracking and monitoring data commands in the pipeline system having a marker register and a frame buffer are also provided in accordance with this invention. The methods comprise establishing a value for a marker, transmitting a data block through the pipeline, inserting a marker command with the marker value into the pipeline, recording the marker value at predetermined registers along the pipeline, and checking the marker register at predetermined points along the pipeline.

Computer work station window systems comprising a host, a graphic subsystem, a frame buffer, a pipeline graphics processor and a pipeline bypass are provided in accordance with this invention. The computer work stations comprise address manipulator means interfaced with the pipeline bypass for transforming graphics rendered on windows according to window relative addresses to graphics rendered on the frame buffer according to frame buffer relative addresses.

Further in accordance with this invention, systems for rendering primitives, initially rendered in window relative addresses, to a graphics frame buffer are provided. The systems comprise host processor means for providing graphics commands to render primitives in window relative addresses, scan converter means interfaced with the host processor means for rendering the graphics primitives through a graphics pipeline on the graphics frame buffer according to window relative addresses, pipeline bypass means interfaced with the host processor means for bussing window offset addresses from the host, the window offset addresses specifying the window's position on the frame buffer, and table means interfaced with the pipeline bypass means for receiving and storing the window offset addresses and applying the window offset addresses to the window relative addresses, thereby rendering the graphics primitives to the frame buffer according to the frame buffer relative addresses determined according to the window offset addresses.

Methods of rendering graphics primitives to a frame buffer without flushing the pipeline to change window offset addresses are provided in accordance with this invention. The methods comprise rendering the graphics primitives through the graphics pipeline according to window relative addresses, determining window offset addresses corresponding to frame buffer relative addresses anytime during the rendering, transmitting window offset addresses to an address manipulator anytime during the rendering, applying the window offset addresses to the window relative addresses to obtain frame buffer relative addresses for the window containing the graphics primitives after the determining and transmitting of the window offset addresses, and transmitting the graphics primitives to the frame buffer according to the frame buffer relative addresses.

Further in accordance with this invention, computer window systems comprising a host, a graphics subsystem, a frame buffer, a pipeline, a pipeline bypass, and an address manipulator are provided. The computer window systems comprise source register means for storing a source reference address of a block of primitives to be moved, destination register means for storing a destination reference address of the block of primitives, dimension register means for storing data indicative of the block's size, source specifier means for storing data indicative of whether the source reference address of the block is a window relative address or a screen relative address, destination specifier means for storing data indicative of whether the destination reference address of the block is a window relative address, or a screen relative address, and table means interfaced with the pipeline bypass means for receiving and storing the window offset addresses and applying the window offset addresses to the window relative addresses, thereby rendering the graphics primitives to the frame buffer according to frame buffer relative addresses determined according to the window offset addresses.

Systems for moving blocks in a window graphics system having a frame buffer are further provided in accordance with this invention. The systems comprise a plurality of first register means for storing source address data of a block in window relative address form, a plurality of second register means interfaced with the plurality of first register means for storing destination address data of the block in frame buffer relative address form, and block moving means interfaced with the first and second register means for moving the block from the source to the destination in accordance with the address data in the first and second register means.

Systems for moving blocks in a window graphics system having a frame buffer are further provided in accordance with this invention. The systems comprise a plurality of first register means for storing source address data of a block in window relative address form, a plurality of second register means interfaced with the plurality of first register means for storing destination address data of the block in window relative address form, and block moving mean interfaced with the first and second register means for moving the block from the source to the destination in accordance with the address data in the first and second register means.

Systems for moving blocks in a window graphics system having a frame buffer are further provided in accordance with this invention. The systems comprise a plurality of first register means for storing source address data of a block in frame buffer relative address form, a plurality of second register means interfaced with the plurality of the first register means for storing destination address data of the block in frame buffer address form, and block moving means interfaced with the first and second register means for moving the block from the source to the destination in accordance with the address data in the first and second register means.

Methods of moving blocks in a graphics window system having a window with a window offset are provided in accordance with this invention. The methods comprise storing source addresses of blocks in a source address register, storing destination addresses of blocks in a destination address register, storing data indicative of block size in a block size register, specifying whether a source address of the block is a frame buffer relative address or a window relative address, specifying whether a destination address of the block is a frame buffer relative address or a window relative address, and moving the block from a source to a destination in accordance with the specification of whether a source address of the block is a frame buffer relative address or a window relative address and the specification of whether a destination address of the block is a frame buffer relative address or window relative address.

Computer systems comprising a host and a graphics subsystem having a frame buffer, a pipeline and pipeline bypass for optimizing the bandwidth between the host and the frame buffer, for providing a high speed path between the frame buffer and the host and for providing a source reference address or a destination reference address in host memory are provided. The systems comprise burst data block means having at least data register between the host and the frame buffer for directly storing data blocks received from the host, block moving means interfaced with the data register for rendering the data blocks to the frame buffer, and alignment register means interfaced with the block moving means for defining a sub-block and for clipping data rendered to the frame buffer which falls outside the sub-block.

Computer systems comprising a host in a graphics subsystem having a frame buffer, a pipeline and a pipeline bypass, for optimizing the bandwidth between the host and the frame buffer, for providing a high speed path between the frame buffer and the host, and for providing a source reference address or a destination reference address in the host memory are further provided in accordance with this invention. The systems comprise burst data block means having at least one data register between the host and frame buffer for directly storing data blocks received from the host, block moving means interfaced with the data register for transmitting the data blocks from the frame buffer to the host, and alignment register means interfaced with the block moving means for defining a sub-block and for clipping data rendered to the frame buffer which falls outside the sub-block.

Systems for transferring blocks directly from a host to a frame buffer are provided in accordance with this invention. The systems comprise pipeline bypass means interfaced with the host and the frame buffer for bussing data first data block means for receiving data blocks from the host and for transmitting data blocks from the frame buffer to the host, address register means interfaced with the host for receiving block reference addresses and block size data from the host, block moving means interfaced with the frame buffer for rendering the blocks to the frame buffer and for transmitting the blocks to the burst data block, and alignment register means interfaced with the block moving means for defining a sub-block and for clipping data rendered to the frame buffer which falls outside the sub-block Methods of rendering blocks in a graphics system having an address manipulator from a host directly to a frame buffer using a burst data block are further provided in accordance with this invention. The methods comprise writing block reference addresses from the host to a data register in the address manipulator, writing block size from the host to a data register in the address manipulator, writing alignment data from the host to a data register, writing block data from the host to a burst data block, rendering the block data to the reference addresses in the frame buffer, and aligning the block data on the block rendered to the frame buffer, defining a sub-block and discarding data which falls outside the sub-block Methods of transmitting blocks in a graphics system having an address manipulator, from a frame buffer directly to a host, using a burst data block are further provided in accordance with this invention. The methods comprise writing block reference addresses from the host to a data register in the address manipulator, writing block size data from the host to a data register in the address manipulator, writing alignment data from the host to a data register, transmitting block data from the frame buffer to the host, and aligning the block data on the block rendered to the frame buffer, defining a sub-block, and discarding data which falls outside the sub-block.

DETAILED DESCRIPTION OF PREFERRED EMBODIMENTS

The inventors of the subject matter herein claimed and disclosed have solved the above mentioned long-felt needs in the art by implementing a graphics window system using a graphics pipeline having a separate path for commands and data which do not require traverse through the graphics pipeline. This separate path is herein defined as a "pipeline bypass bus" and provides data commands and blocks direct access to the frame buffer without passing through the pipeline bus. The pipeline bypass bus supports block moves, block reads and write operations, as well as other data transfer functions in hardware rather than software.

The pipeline bypass bus also provides fast access to the frame buffer for comparatively simple commands originating from the host processor. Furthermore, the pipeline bypass bus reduces graphics pipeline overhead and provides services required by the window system which would otherwise have to be processed through the pipeline bus. While the pipeline bus offers high performance rendering, the pipeline bypass bus offers fast block operations and direct frame buffer access to data output by the host processor.

Figure 1:
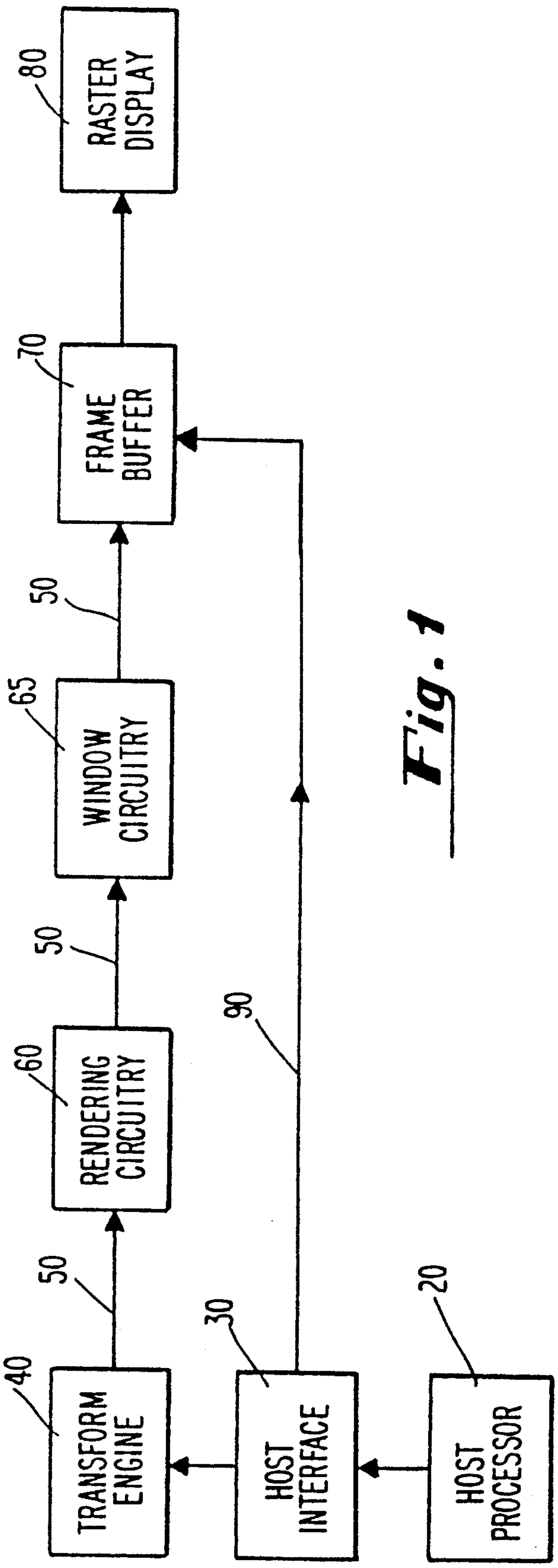
FIG. 1 is a block diagram of a window graphics system utilizing a graphics pipeline and a graphics pipeline bypass.

Referring to FIG. 1, a graphics system is comprised of a host processor 20 which is interfaced 30 to a transform engine 40. The pipeline 50 interfaces the host processor 20 and transform engine 40 with rendering circuit 60. The pipeline 50 is a graphics processor which performs a variety of tasks in the graphics window system. These tasks include bussing data through the graphics system and processing the graphics commands through various hardware blocks and software functions. The terms pipeline, pipeline bus, and pipeline processor are used interchangeably throughout to denote the graphics pipeline processor. Window circuitry 65 in preferred embodiments comprises graphics hardware provided in accordance with this invention for rendering graphics primitives on windows to frame buffer 70. Window circuitry in interfaced wth frame buffer 70 and rendering circuitry 60. These graphics primitives, as well as other graphics commands, are output from host processor 20 and manipulated by transform engine 40 through graphics pipeline 50 for rendering to frame buffer 70. After rendering circuit 60 renders a window with a particular context through window circuitry 65 on frame buffer 70, the window is output on raster display 80.

A pipeline bypass bus 90 is interfaced 30 to host processor 20 and frame buffer 70. Pipeline bypass bus 90 provides a separate path for data from host processor 20 to frame buffer 70. Thus, when data passes through pipeline bypass bus 90 to frame buffer 70, no overhead time through the graphics pipeline is incurred. Pipeline bypass bus 90 offers fast block transfer operations and direct frame buffer access for data output from host processor 20.

In preferred embodiments, hardware solutions which eliminate the need for pipeline flushing and which reduce pipeline latency, thereby increasing window acceleration through the system are provided in accordance with this invention. In still further preferred embodiments, hardware implementations allow storage of multiple graphics contexts on the graphics system.

Furthermore with methods and apparatus provided in accordance with this invention, windows in the graphics system may be viewed as "virtual" devices. A virtual device operates according to window relative addresses through the graphics pipeline independent of addresses corresponding to the frame buffer or raster display. Since windows and window context switching may thus be rendered according to window relative addresses, the need for pipeline flushing is eliminated and pipeline latency is significantly reduced. Thus, each window in the window system can view the graphics pipeline as an exclusive resource since time consuming manipulations of windows which increase pipeline latency are eliminated. Therefore, methods and apparatus provided in accordance with this invention solve a long-felt need in the art for graphics systems which support multiple window contexts and eliminate the need for pipeline flushing.

Figure 2:
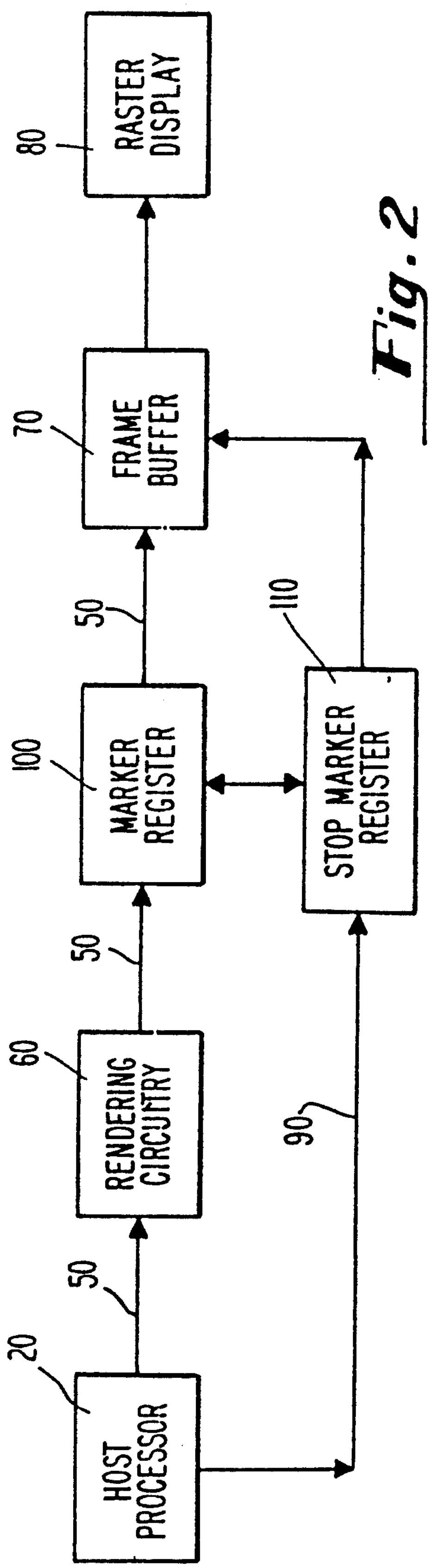
FIG. 2 is a block diagram of a window graphics system utilizing a graphics pipeline, a graphics pipeline bypass, a marker register and a stopmarker register.

Referring to FIG. 2, host processor 20 is interfaced along pipeline 50 with rendering circuit 60. Interposed between rendering circuit 60 and frame buffer 70 is a marker register 100. In preferred embodiments, the pipeline marker register 100 is accessed by the host processor 20 through the pipeline bus 50 without affecting data flowing through the pipeline. Marker register 100 prevents unnecessary pipeline flushing when it is desired to change a window context.

A window context change often requires swapping of system resources such as, for example, window clipping planes or window display mode planes. Furthermore, these system resources oftentimes must be swapped during the context switch because they are a limited resource and are shared between multiple processes. Marker register 100 provides a preferred resource for switching contexts when compared with previous software solutions which might tend to reduce the need for pipeline flushing, but do not —and cannot—eliminate it.

In preferred embodiments, marker register 100 keeps track of currently active contexts which traverse the graphics pipeline 50 from host processor 20. In further preferred embodiments, a "marker" is sent down the pipeline 50 from host processor 20 between each context switch. The marker register is incremented each time a context traverses the pipeline such that a table of contexts currently in the pipeline is maintained by the system in marker register 100. The table shows the context number, the window clipping planes, window identification, and marker numbers for each active context in the pipeline. As the contexts are processed through the pipeline bus 50, pipeline marker register 100 is automatically updated each time a marker reaches the end of pipeline bus 50.

A stopmarker register 110 is interfaced on the pipeline bypass bus 90 between host processor 20 and frame buffer 70. In still further preferred embodiments, stopmarker register 110 is set with a particular value according to the particular application specified by host processor 20 and the user. When a context switch occurs, the window system can read the value of marker register 100 and compare this value with the predetermined value in stopmarker register 110 to determine which contexts are still in the pipeline. If the marker register value equals the stopmarker register value, the window system will wait until the current context has been processed by the system and rendered to frame buffer 70. If the stopmarker register value is not equal to the marker register value, the context being swapped is not in the pipeline and the context switch and clipping plane changes can occur immediately. Therefore, under no circumstances will it be necessary to halt data flow in the pipeline or prevent the host processor from continuing to place commands and data onto the pipeline. Thus, the need for pipeline flushing is eliminated.

Figure 3:
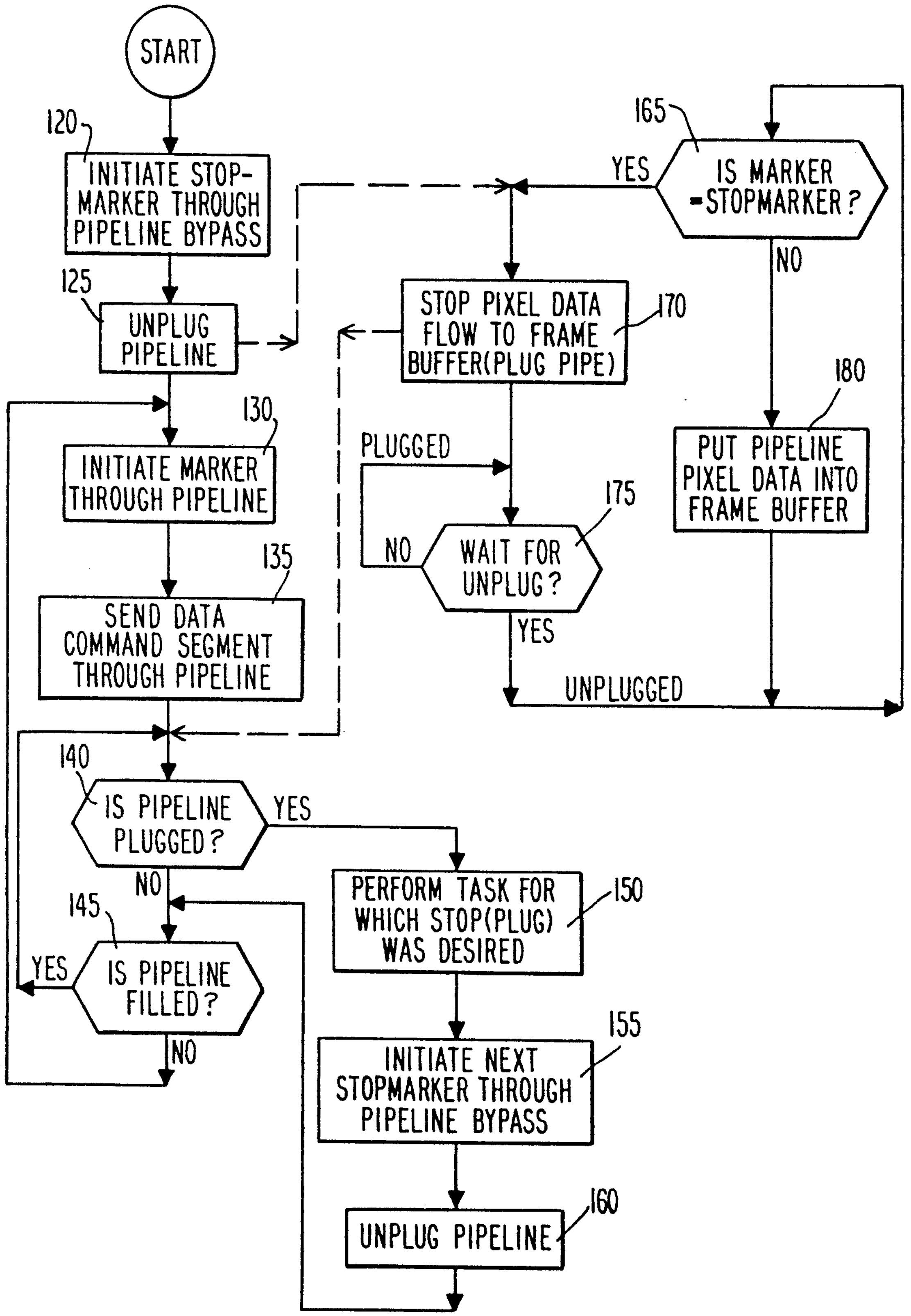
FIG. 3 is a flow chart of a method provided in accordance with this invention utilizing marker registers and stopmarker registers.

Referring to FIG. 3, a flow chart of a preferred embodiment of a method implementing the marker/stopmarker system of FIG. 2 is illustrated. The system initiates a stopmarker register through the pipeline bypass at step 120. It is then desired to "unplug" the pipeline at step 125. The system initiates a marker register through the pipeline at step 130 and sends data command segments through the pipeline at step 135.

The host processor interrogates the system at step 140 to determine if the pipeline is "plugged." The term "plugged" used herein means that data and graphics commands do not flow through the pipeline. If the pipeline is plugged, then the system performs the task for which the stop or plug was desired at step 150. The system then initiates the next stopmarker through the pipeline bypass at step 155 and unplugs the pipeline at step 160.

If the pipeline was not plugged, then the system asks if the pipeline is filled at step 145. If the pipeline is filled, then the system returns to step 140. However, if the pipeline is not filled, then the system returns to step 125 where it unplugs the pipeline.

Occurring simultaneously with step 125, the host processor interrogates the system to determine at step 165 if the marker register value is equal to the stopmarker register value. If the stopmarker register value is equal to the marker register value, then the system stops pixel data flow to the frame buffer or "plugs" the pipeline at step 170. The host processor then interrogates the system to determine whether the pipeline has been unplugged at step 175. If the pipeline has not been unplugged, then the system waits.

If the system is unplugged, then the host processor interrogates the system at step 165 again to determine if the marker value is equal to the stopmarker value. If the stopmarker value is not equal to the marker value, then the host processor outputs a command at step 180 which allows the pixel cache to write data to the frame buffer.

Otherwise, the host processor plugs the pipeline at step 170 at which time the host processor interrogates the system to determine whether the pipeline is plugged at step 140. Thus, the need to flush the pipeline has been eliminated since plugging of the pipeline need only occur between the pixel cache and the frame buffer for relatively short periods of time while complex processing and matrix transformation occurs earlier in the pipeline. This advantageous result is achieved since the marker and stopmarker registers tell the graphics system when the pixel data flow to the frame buffer must wait since a particular context has not yet been rendered to the frame buffer.

Context switching utilizing the marker and stopmarker hardware provided in accordance with this invention thus eliminates the need for pipeline flushing since the graphics pipeline need never be emptied of data in order to determine whether a current context has been rendered to the frame buffer. In this fashion, extremely fast and efficient context switching can be accomplished, thereby significantly improving overall graphics system performance. The marker register and stopmarker register hardware provided in accordance with this invention satisfies a long-felt need in the art for context switching in graphics systems utilizing a pipeline bus and pipeline bypass bus.

The inventors of the subject matter herein claimed and disclosed have discovered that any graphics application will run faster when it views itself as the sole owner of the graphics system. This is a consequence of the fact that when a graphics application requests a window, the corresponding frame buffer memory is allocated to that application for graphics output. Thus, an ideal environment for graphics rendering would allow each graphics process to treat the window as a "stand alone" or virtual graphics device.

Previous graphics systems have usually required the graphics process to be modified to run inside a window. These systems require the application to be "window smart" and post-process the application output to conform to the window environment by adding window offsets, or clipping to window boundaries. Software which performs these functions considerably reduces overall system performance since an inordinate amount of host processor time is required to perform these tasks. The inventors of the subject matter herein claimed and disclosed have implemented graphics functions in hardware which allow primitives in the pipeline bus to be specified relative to the window origin.

In preferred embodiments, the window origin is a reference for the graphics primitives which are rendered to the window. Translation to screen relative or "frame buffer relative addresses" occurs after scan conversion according to window relative addresses and before frame buffer access. Thus, the application treats the window as a full screen "virtual" device since the graphics system renders primitives as if the window comprises the entire frame buffer.

Operations of this nature may be performed by a transformation matrix. However, if the window offset is included in the matrix stack, the pipeline must be flushed every time the window is moved or changed. After flushing the pipeline, the new window offset may then be added to the transformation matrix and the pipeline must be filled up again. Thus, a more preferred solution is to allow the application to access the window as if it owned the entire screen or frame buffer, then provide hardware to receive window offset data corresponding to frame buffer relative addresses so that the window containing the graphics primitives can be rendered to the frame buffer according to frame buffer relative addresses.

By rendering primitives in window relative coordinates and performing the window relative to screen relative conversion downstream from the rendering hardware in the pipeline, the need to flush the pipeline in order to render a window to the frame buffer is eliminated. Window translation thus accomplished in hardware is completely transparent to the application The offset operations are performed in parallel with other pipeline operations through the pipeline bypass bus so that no performance penalty for the various block operations or context switches is introduced to the window graphics system.

Figure 4:
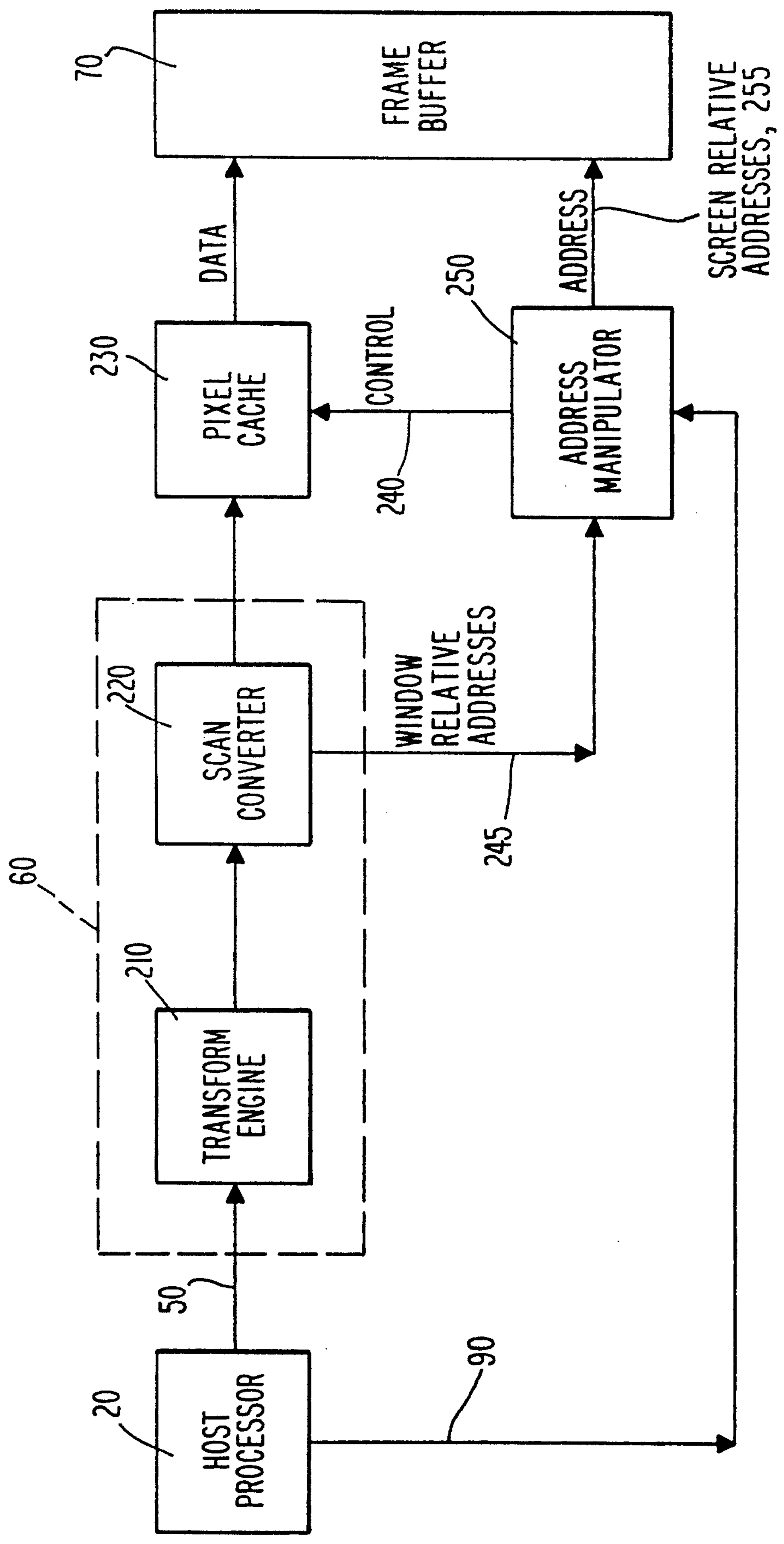
FIG. 4 is a block diagram of a window graphics system wherein window relative addressing is performed.

Referring to FIG. 4, host processor 20 is interfaced with rendering circuit 60. In preferred embodiments, rendering circuit 60 comprises a transform engine 210 and a scan converter 220. Preferably, the scan converter is a raster scan converter. Interfaced with the scan converter along pipeline bus 50 is a pixel cache 230. Pixel cache 230 is further interfaced with frame buffer 70. In still further preferred embodiments, video random access memory VRAM 240 comprises the addressable frame buffer for the system. An address manipulator 250 is interfaced on pipeline bypass bus 90. Address manipulator 250 is interposed along pipeline bypass bus 90 between host processor 20 and frame buffer 70.

In yet further preferred embodiments, address manipulator 250 comprises data registers for receiving offset addresses for each window from host processor 20 window relative conversion circuitry, and data register for storing window identification. The window offsets are applied to each window by address manipulator 250 before the windows containing graphics primitives are rendered to frame buffer 70. Since the window offsets are written to address manipulator 250 through pipeline bypass bus 90, they may be updated asynchronously. The windows can thus be moved or shuffled on the frame buffer through pipeline bypass 90 simultaneously as window relative rendering of graphics primitives occurs at scan converter 220 through pipeline bus 50. Graphics applications and processes may therefore run on graphics pipeline bus 50 without explicit knowledge of their eventual window location on the frame buffer. Thus, windows in graphic systems provided in accordance with this invention truly function as virtual devices since they are able to view the graphics pipeline as an exclusive resource during window relative rendering operations.

Preferably, pixel cache 230 is interfaced with address manipulator through a central bus 240. The pixel cache 230 contains window relative addresses 245 of graphics primitives which have been rendered on the window with respect to the window origin. Since window offset data is written to address manipulator 250 through pipeline bypass bus 90, the pixel cache 230 interfaces 245 with address manipulator 250 to provide the window relative data which will be combined with the window offset addresses in the address manipulator. Address manipulator 250 is also interfaced with frame buffer 70 so that the graphics windows can be rendered to the frame buffer according to frame buffer relative addresses 255.

Since address manipulator 250 applies the window offsets to the window relative addressed graphics primitives, the need for flushing graphics pipeline 50 when context changes occur is eliminated and pipeline latency for the graphics systems is greatly reduced. These advantageous results are achieved since the complex manipulation associated with rendering the graphics primitives in frame buffer relative addresses directly through the graphics pipeline is eliminated with systems and methods provided in accordance with this invention.

Figure 5:
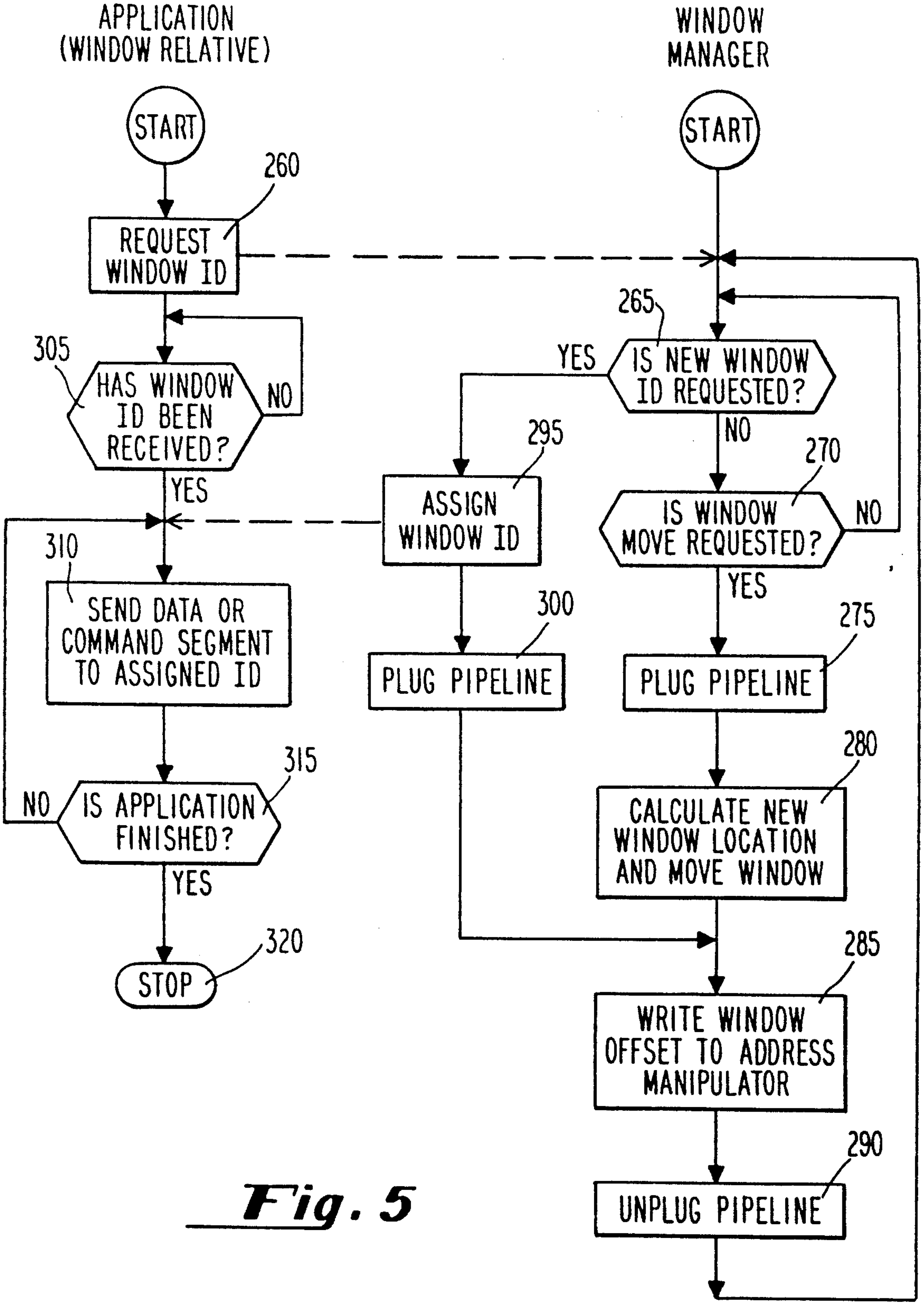
FIG. 5 is a flow chart of a method provided in accordance with this invention for window relative addressing and implementing virtual windows.

A flow chart to accomplish window relative rendering in window graphics systems provided in accordance with this invention is shown in FIG. 5. A window manager the pipeline processes an application through the pipeline. The application requests a window ID at step 260. The window manager determines whether a new window ID has been requested at step 265. If a new window ID has not been requested, then the window manager determines whether a window move has been requested at step 270. If a window move has not been requested, then the process returns to step 265. However, if a window move is requested, then the window manager plugs the pipeline at step 275.

The window manager then calculates a new window location and moves the window at step 280. Furthermore, the window manager writes the window offset to the address manipulator at step 285 and unplugs the pipeline at step 290. The process then returns to step 265 to determine whether a new window ID has been requested. Since a new window ID has not been requested at this point, the window manager assigns a window ID at step 295 and plugs the pipeline at step 300.

The host processor then interrogates the system at step 305 to determine whether the new window ID has been received If the new window ID has not been received, then the system waits until the window manager sends a new window ID However, if a new window ID has been received, the host processor sends the application which comprises data or command segments to the assigned window ID through the pipeline at step 310. The host processor then determines whether the application is finished at step 315. If the application is not finished, then the host processor sends additional data or command segments through the pipeline at step 310 However, if the application is finished, then the window can be said to have been rendered and the window manager will have moved the window to its new location at step 280. The process then stops at 320 until another window traverses the pipeline.

Window relative rendering accomplished methods illustrated in FIG. 5 eliminates the need for pipeline flushing. The window manager independently applies window offset addresses to window relative data while the pipeline can simultaneously process windows according to window relative addresses. This has not been heretofore achieved in the art and significantly increases the speed and timeliness of rendering of graphics primitives to the frame buffer.

Graphics window systems must support block move operations in order to maximize the system's performance. Furthermore, block move operations generally support basic window primitives including raster texts and icons. Other types of graphics block moves such as shuffles and block "resizes" must also take advantage of the system's block moving capabilities.

A "block" may be considered an entire window or merely part of a window comprising a set graphics primitives on the graphics system. Block moves are particularly difficult to handle in a window environment because window offset addresses need to be included in these operations which are typically implemented as screen address relative. In contrast, block move operations inside a window must be window relative so that forcing all block moves in the graphics system to be window relative is neither an adequate nor versatile solution. The reason that block move operations inside a window must be window relative is that many objects, for example fonts, are stored in off screen memory on the frame buffer and thus these objects are identified exclusively according to frame buffer relative addresses.

The inventors of the subject matter herein claimed and disclosed have discovered that implementation of a graphics block mover in hardware allows the graphics system to handle several different kinds of block moving operations. In preferred embodiments, implementation of the block mover in hardware includes a register having the ability to store a bit for each operand output from the host processor that specifies whether the operand is window address relative or screen address relative. Block moves accomplished by methods and systems provided in accordance with this invention can thus be window relative, screen relative, or any combination thereof.

Window systems provided in accordance with this invention may include block moving hardware which supplies window offsets through a pipeline bypass bus for windows having graphics primitives rendered thereon according to window relative addresses. In still further preferred embodiments, block moves initiated in accordance with this invention write the block's source and destination addresses, the block's width and height, and a particular replacement rule to the address manipulator through the pipeline bypass bus prior to initiation of the block move.

Thus, block moving hardware provided in accordance with this invention does not require the window to make decisions about its particular coordinate system as it traverses the graphics pipeline. This eliminates the need for the window system to incur additional processor overhead while manipulating graphics primitives according to frame relative addresses which would necessarily occur in parallel with processing the application or context. In preferred embodiments, if a block is off screen in the work area of the frame buffer it may automatically be assumed to be screen relative. However, if the block is displayed in the active screen area of the frame buffer, it may be assumed to be addressed window relative.

Figure 6:
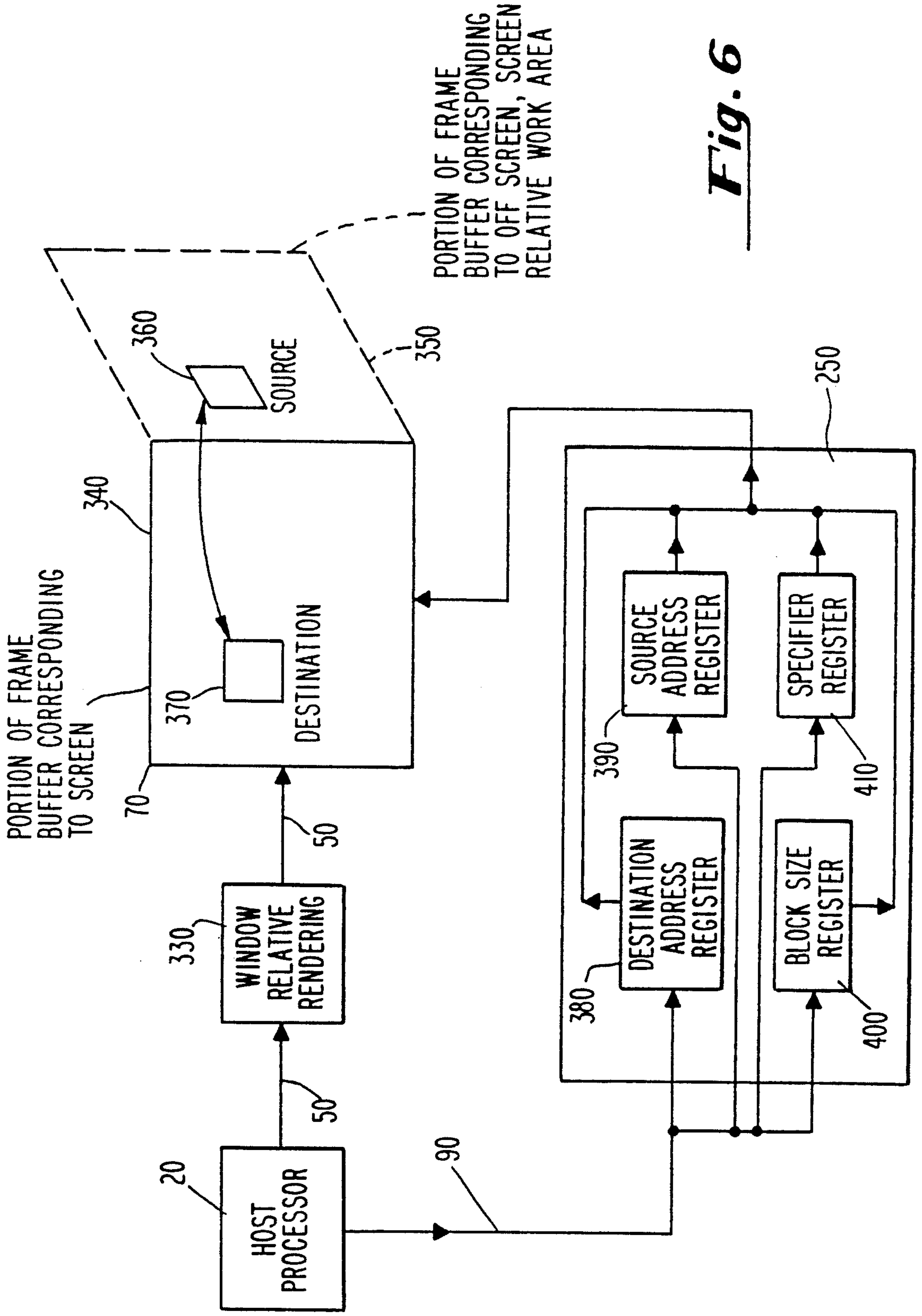
FIG. 6 is a block diagram of a window graphics system utilizing a graphics pipeline and a graphics pipeline bypass for moving block data through the graphics pipeline bypass to a frame buffer.

Referring to FIG. 6, host processor 20 outputs graphics commands along pipeline bus 50 to window relative rendering circuit 330. Window relative rendering circuit 330 generally comprises raster scanning means and pixel cache buffer means as exemplified in the earlier figures. Window relative rendering circuit 330 renders graphics primitives to the window according to window relative addresses.

Window relative rendering circuit 330 is further interfaced with frame buffer 70. In preferred embodiments, frame buffer 70 is a VRAM. Frame buffer 70 may be conceptually broken into two parts. The first part 340 corresponds to screen addresses, i.e., places on the video screen where graphics primitives will actually be displayed. The second portion of the frame buffer 350 corresponds to an "off screen" work area. The off screen work area 350 is an area where windows or blocks which have not been rendered on the video screen of the graphics system exist exclusively according to frame buffer relative addresses. Blocks which appear on the first portion of the frame buffer 340 may be addressed relative to the screen in frame buffer relative addresses or window relative addresses as they are processed through the pipeline.

In preferred embodiments a source block 360 may be moved from the work area 350 to destination window or block 370 in the first portion 340 of frame buffer 70. It will be recognized by those with skill in the art that the source and destination addresses could be interchanged such that blocks can be moved window relative, screen relative or any combination thereof.

In order to move blocks between a destination and a source, host processor 20 outputs window offset information over pipeline bypass bus 90 to a variety of data registers which comprise address manipulator 250. Destination register 380 is adapted to store the destination address of the block output by host processor 20. Source address register 390 is adapted to receive the block's source address over the pipeline bypass 90 output by host processor 20. In further preferred embodiments, it is desired to write the block size to the block size register 400. In still further preferred embodiments, the block size comprises the block's width and height so that the block may be correctly written to the appropriate destination in the frame buffer.

The specifier register 410 is adapted to receive data from host processor 20 through pipeline bypass bus 90 which specifies whether the block to be moved is currently window address relative or frame buffer address relative. In still further preferred embodiments, a single bit of the operand received from host processor 20 and stored in specifier register 410 specifies whether the block is window or screen relative. Thus, with methods and apparatus provided in accordance with this invention, blocks may be moved which are window address relative or screen address relative, and between sources and destinations which are window relative addressed or frame buffer relative addressed.

Similarly, the source addresses and destination addresses may be specified either according to window relative addresses or frame buffer relative addresses and blocks may be concomitantly moved between sources and destinations addresses either within windows, or in and around the frame buffer. Systems and methods provided in accordance with this invention therefore satisfy a long-felt need in the art for highly efficient and versatile block moving circuitry in graphic windowing systems that utilize graphics pipelines.

Figure 7:
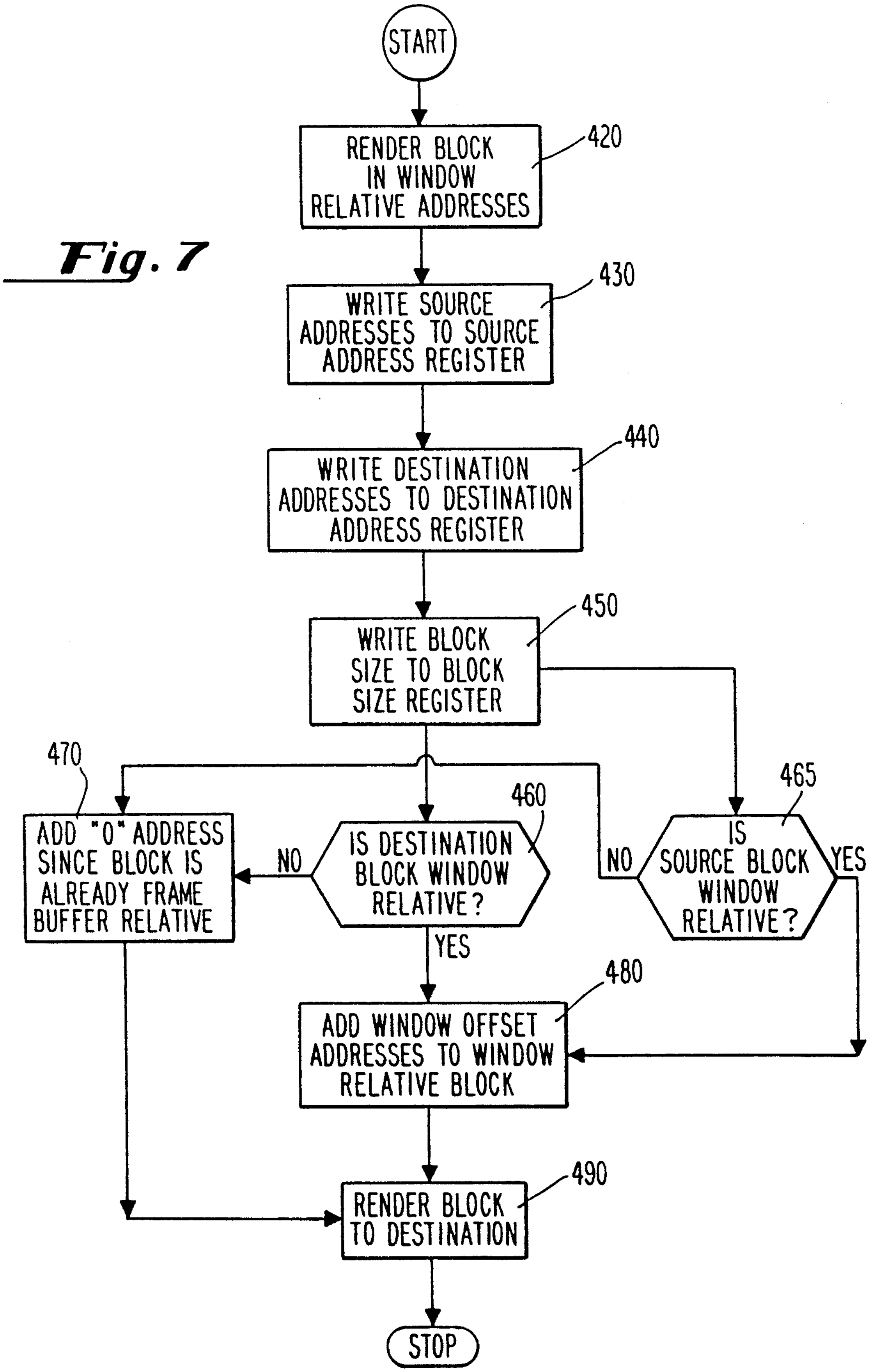
FIG. 7 is a flow chart of a method provided in accordance with this invention for moving block data and rendering the block data on a frame buffer according to frame buffer relative addresses.

Referring to FIG. 7, a flow chart of block moving methods provided in accordance with this invention is shown. In preferred embodiments, a block is rendered through a graphics pipeline according to window relative addresses at step 420. The block's source addresses are written through the pipeline bypass to the source address register at step 430. Similarly, the block's destination addresses are written to the destination address register through the pipeline bypass bus at step 440. It is desired to write the block's size to the block size register through the pipeline bypass bus at step 450.

The host processor interrogates a specifier register at step 460 to determine whether a destination block has been addressed according to window relative addresses or frame buffer relative addresses. Similarly, the host processor interrogates a specifier register at step 465 to determine whether a source block has been addressed according to window relative or frame buffer relative addresses. If the blocks have been addressed according to frame buffer relative addresses a "zero" window offset is applied at step 470 which effectively does not change the block addresses since the block is considered to be frame buffer relative addressed.

However, if the specifier register indicates that the blocks are window address relative, then the window offset addresses are applied to the block at step 480 so that the blocks are correctly addressed according to frame buffer relative addresses before the blocks are rendered to the destination on the system frame buffer or screen. After the window offsets have been applied to the window relative addressed blocks, the blocks may be rendered to their destinations on the frame buffer at step 490.

In still further preferred embodiments, the block window offset addresses are written to the address manipulator through the pipeline bypass bus rather than through the graphics pipeline bus. Therefore, the graphics pipeline is not used to address the block relative to the frame buffer and thus is free to perform graphics primitive renderings to blocks and windows entirely according to window relative addresses Methods and systems provided in accordance with this invention reduce pipeline latency since each window is in effect treated as a virtual device in the system. Furthermore, methods and apparatus provided in accordance with this invention solve a long-felt need in the art for graphics pipelines that eliminate the need for pipeline flushing since the time consuming task of adding window offsets to window relative addressed blocks and obtaining frame buffer relative addressed blocks is eliminated. This goal is accomplished by implementing a graphics pipeline bus having hardware adapted to perform these tasks.

Modern graphics window systems having graphics pipelines exhibit a need for the ability to move large amounts of pixel data to and from the system's memory. Software solutions which have given previous graphics systems the ability to move large amounts of data in this fashion require an inordinate amount of processor time to accomplish this function. Thus, previous window systems utilizing a graphics pipeline with special purpose software to provide large data block movement capability do not satisfy a long-felt need in the art for graphics window systems which can move large data blocks efficiently without unduly burdening the host processor and graphics pipeline.

Figure 8:
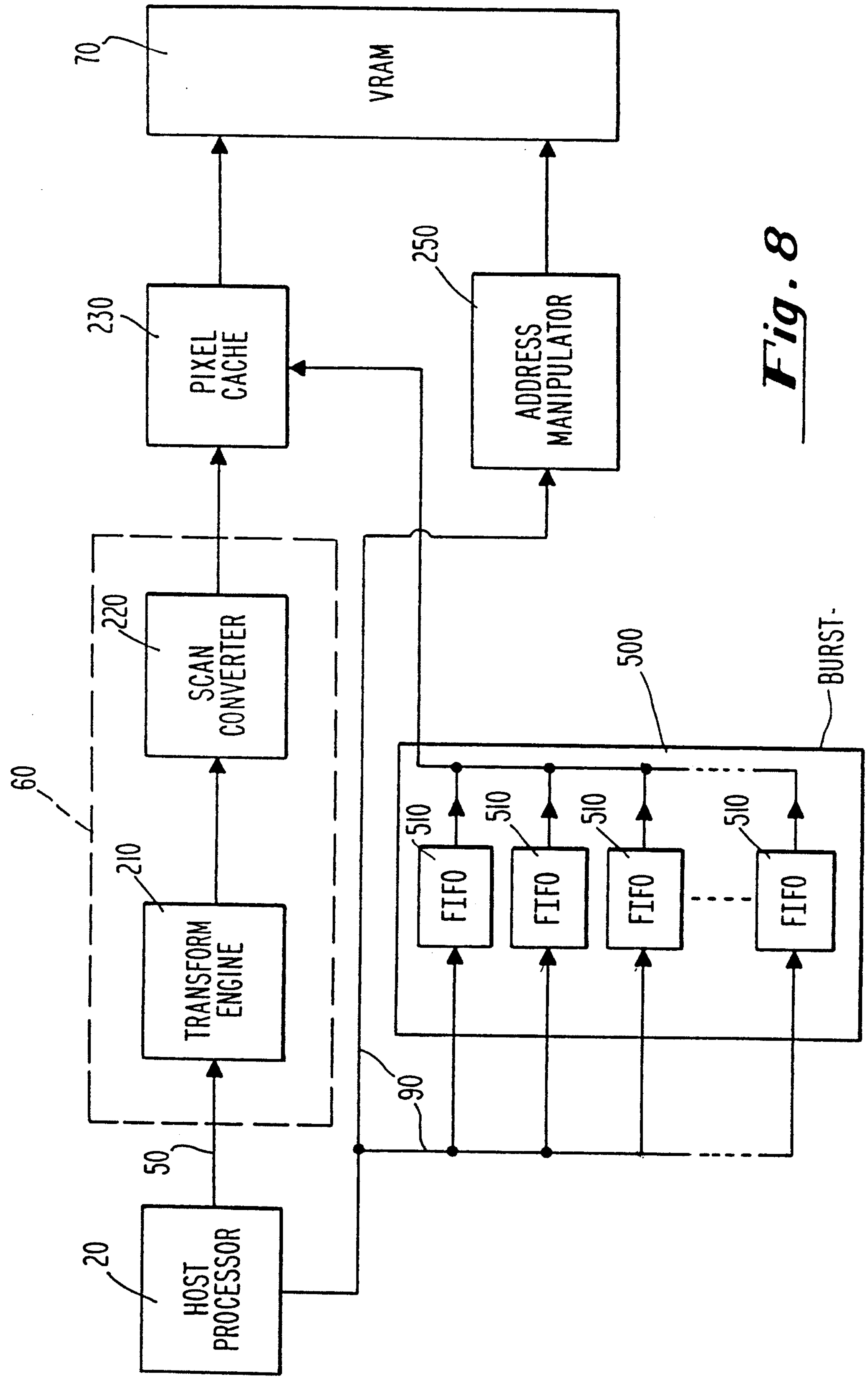
FIG. 8 is a block diagram of a graphics window system for transferring large data blocks from a host processor to a frame buffer through a burst block utilizing FIFO registers.

Referring to FIG. 8, "burst" data hardware block 500 is provided in accordance with this invention interfaced in pipeline bypass bus 90 and interposed between host processor 20 and pixel cache 230. The data block 500 is denoted a "burst" data block since host processor 20 can load data block 500 with extremely large blocks of data through pipeline bypass bus 90. Generally, these large blocks of data may comprise graphics animation data which will be written to the frame buffer. These large blocks of data are organized as multiple rows of pixels, called "scanlines." The data is organized in host processor memory as an array of data with the first datum being the leftmost pixel of the first scanline, then proceeding along the scanline to the rightmost pixel of the first scanline, and then back to the leftmost pixel of the second scanline, etc. This forms a two dimensional array of pixel data to be sent to the frame buffer.

The burst is comprised of a number of first-in, first-out (FIFO) registers shown at 510. The FIFO's are organized in banks. There are from one to "n" banks of FIFO's. Each FIFO bank buffers pixels along the scanline. The number of pixels buffered along a scanline is dependent on the depth of the FIFO's. Multiple scanlines, equal to the number of FIFO banks, can be buffered. The input port and output port of the FIFO's operate independently. Data is transferred from the host processor 20 to the FIFO input ports independently and in parallel with data transferred from the FIFO output ports to the pixel cache 230.

The banks are connected in parallel as seen from the pipeline bypass bus 90. The host processor 20 writes data to the input port of one of the FIFO banks from one scanline of data until that FIFO bank is full. The host processor then writes data to the input port of the next FIFO bank from the next scanline of data.

When data is available in all FIFO banks, data transfer from the output port of the FIFO's 510 to the pixel cache can start. This happens in parallel with host processor 20 sending data to the input port of the FIFO's 510. The pixel cache 230 is interfaced with VRAM 70 to allow data in burst 500 to be written to the frame buffer.

The graphics pipeline 50 is then plugged, and pixel data transfer from the graphics pipeline 50 into the frame buffer is suspended while the data transfer from burst 500 is active. Since burst 500 is interfaced with the pixel cache 230 through the pipeline bypass bus 90, the need to flush the graphics pipeline is eliminated.

If only a sub-region "sub-block" of the two dimensional area of pixel data is to be sent to the frame buffer, a way to clip data from the left and right edges is provided. Two additional offset operands from the host processor are written to the address manipulator 230. The offsets specify the number of pixels along a scanline from the beginning of the scanline to the right edge and the left edge of the desired sub-block of data. These offsets instruct the address manipulator to clip the data transferred from the FIFO's 510 to the pixel cache 230; that is to the right, or to the left of the desired sub-block of data.

In preferred embodiments, burst 500 is comprised of a number of first-in, first-out (FIFO) registers, shown generally at 510. The FIFO's 510 are connected in parallel with each other in the burst block 500. FIFO's 510 are interfaced with the pipeline bypass bus 90 so that host processor 20 can move large data blocks in parallel to each of the FIFO's 510. The amount of data bussed from host processor 20 to burst 500 is only limited by the number of FIFO's which are connected in parallel in the burst block.

Burst 500 is interfaced with pixel cache 230 so that it may transfer the data in FIFO's 510 to pixel cache 230 after host processor 20 has written the desired data to FIFO's 510. Pixel cache 230 is interfaced with VRAM 70 to allow data in burst 500 to be rendered to the frame buffer. Since burst 500 is interfaced with the pixel cache through pipeline bypass bus 90, the graphics pipeline 50 is free to perform window relative rendering of other graphics primitives output from host processor 20.

Therefore, use of burst 500 interfaced with graphics pipeline bypass bus 90 reduces graphics pipeline latency and eliminates the need to flush the pipeline 50 when a context switch for the data in burst 500 is desired.

In still further preferred embodiments, address manipulator 250 is provided interfaced on the pipeline bypass bus 90 interposed between host processor 20 and VRAM 70. The address manipulator functions as described above and renders the data in burst 500 according to frame buffer relative addresses on the VRAM 70. It is necessary to utilize address manipulator 250 since the data written to FIFO's 510 in burst 500 from host processor 20 may appear in window relative addresses. Thus, host processor 20 writes window offset addresses for the data in FIFO's 510 to a data register in the address manipulator so that address manipulator 250 may render the data in FIFO's 510 according to frame buffer relative addresses on VRAM 70.

Address manipulator 250 also aligns data written in the FIFO's 510 on the frame buffer. Alignment is accomplished by an additional offset operand from the host processor 20 written to the address manipulator 250 which instructs the address manipulator to clip data in FIFO's 510 which will be input to pixel cache 230 and which falls outside of the specified block on frame buffer 240 when the data is rendered. In preferred embodiments, clipping is necessary since block data output from burst 500 is potentially large enough to fall outside the particular destination addresses on the frame buffer.

Figure 9A:
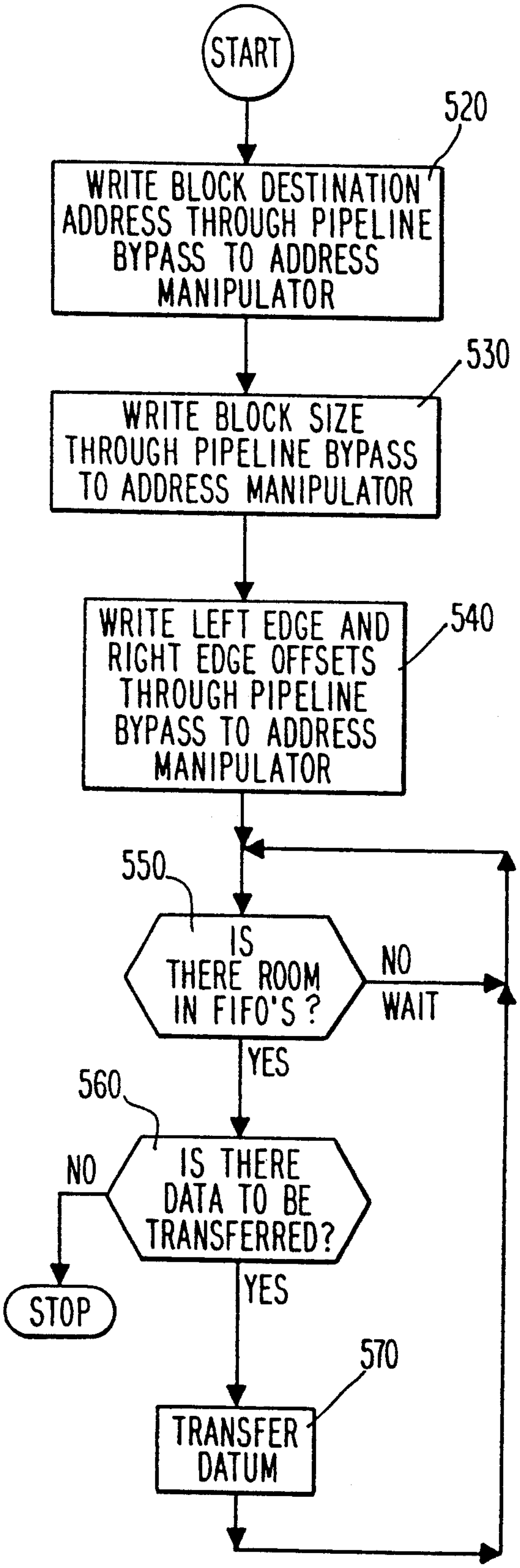
FIG. 9A is a flow chart of a method provided in accordance with this invention for transferring large blocks of data along a pipeline bypass from a host processor to a burst block.

Referring to FIG. 9A, a flow chart of a preferred embodiment of transfer of large data blocks from a host processor to a burst block is shown. The block destination addresses are written through the pipeline bypass to the address manipulator at step 520. Similarly, the block size is written through the pipeline bypass bus from the host processor to the address manipulator at step 530. It is then desired to write left edge and right edge offsets through the pipeline bypass to the address manipulator at step 540.

Left edge and right edge offsets are then written through the pipeline bypass bus to the address manipulator at step 540. At step 550 the host processor interrogates the FIFO's to determine whether there is room in the FIFO's. If there is not room in the FIFO's, then the process must wait. However, if there is room in the FIFO's, the host processor asks if there is data to be transferred at step 560. If there is not data to be transferred, the process stops. However, if there is data to be transferred, then individual datum are transferred at step 570. In this fashion data from the host processor may be transferred to the burst block.

Figure 9B:
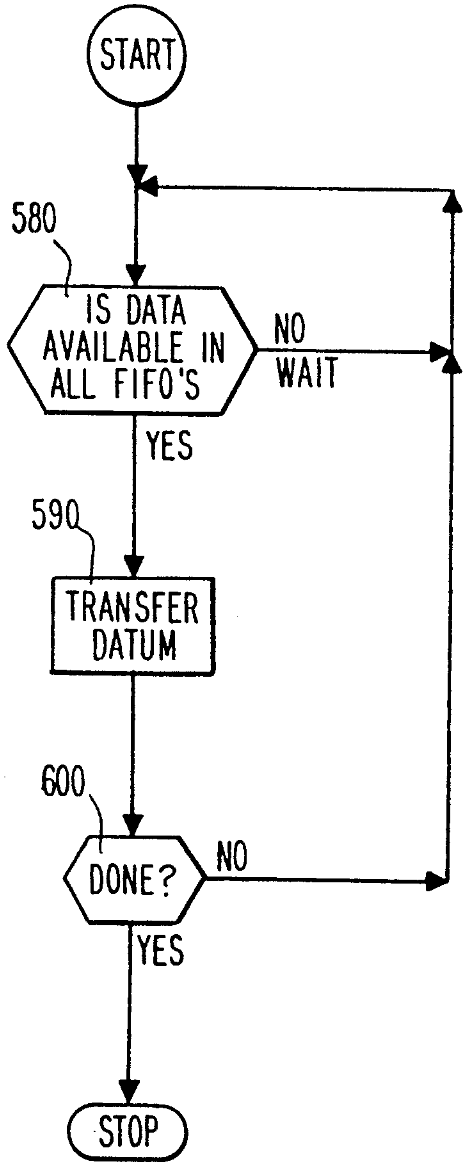
FIG. 9B is a flow chart of a method provided in accordance with this invention for transferring data from a burst block to a pixel cache.

Referring to FIG. 9B, a preferred embodiment of a flow chart for transferring data from a burst block to a pixel cache is shown. The host processor interrogates the burst block at step 580 to determine if there is data available in all of the FIFO's. If data is not available from all of the FIFO's, then the process must wait However, if data is available from all of the FIFO's, then individual transfers of datum from the burst block to the pixel cache at step 590 is accomplished. The host processor then interrogates the system at step 600 to determine if all the data has been transferred. If all data transfer has occurred, then the process stops.

If the block is not aligned, then the data which falls outside the window must be clipped from the block so that it is not rendered on the screen impermissibly outside the window. In this fashion, the burst data can be rendered to the frame buffer through the pipeline bypass, thereby freeing the graphics pipeline from high overhead operations. Therefore, burst transfer operations provided in accordance with this invention satisfy a long-felt need in the art for window systems having the ability to move a large amount of pixel data to around the system in an efficient manner.

Methods and apparatus provided in accordance with this invention which implement hardware solutions on pipeline bypass buses in window systems utilizing a graphics pipeline satisfy a long-felt need in the art for methods and systems which eliminate the need for pipeline flushing and reduce pipeline latency. These long-felt needs have not heretofore been satisfied in the art by previous graphics window systems utilizing software solutions. Graphics window systems utilizing graphics pipelines provided in accordance with this invention exhibit significant improvement compared to previous modern systems which render graphics primitives to a frame buffer or screen. The graphics windows systems provided in accordance with this invention treat windows as virtual graphics devices, thereby eliminating the need for pipeline flushing during context switching, and greatly reducing pipeline latency.

There have thus been described certain preferred embodiments of methods and apparatus for accelerating graphics rendering in graphics window systems. While preferred embodiments have been disclosed and described, it will be readily apparent to those with skill in the art that modifications are within the true spirit and scope of the invention. The appended claims are intended to cover all such modifications.

What is claimed is:

1. Apparatus for use in a computer system for eliminating the need for pipeline flushing by interrupting data flow between rendering circuitry and a frame buffer, said computer system comprising a graphics subsystem having a frame buffer and a pipeline wherein said frame buffer and said rendering circuitry are connected to said pipeline, said apparatus comprising:

a marker register, connected in said pipeline between said rendering circuitry and said frame buffer, for keeping track of the multiple contexts which traverse the pipeline by keeping track of markers passing through said pipeline; and a host, connected to said pipeline, for generating graphics primitives; for generating contexts; for generating markers, said graphics primitives, contexts and markers being provided to said pipeline, wherein a marker is provided between each context; for interrogating said marker register; and for interrupting data flowing through said pipeline to said frame buffer in response to the tracking of multiple contexts by the interrogation of said marker register by said host.

2. The system recited in claim 1 wherein the computer system further comprises a pipeline bypass connecting said host to said frame buffer and a stopmarker register interfaced with the pipeline bypass for storing a predetermined value, the value being used for determining which of the multiple contexts are in the pipeline.

3. The system recited in claim 2 wherein the the marker register stores a marker value between each context switch and the host interrupts data flow when the stopmarker value equals the marker value.

4. The system recited in claim 2 wherein the stopmarker register is initiated through the pipeline bypass between the host and the frame buffer.

5. The system recited in claim 1 wherein the marker register is automatically updated by a marker sent down the pipeline between the host and the frame buffer.

6. A system for eliminating the need for flushing a graphics pipeline, wherein multiple contexts traverse said pipeline, comprising:

a frame buffer;

a host processor for providing graphics commands for controlling rendering of data in said frame buffer and for providing markers;

a graphics pipeline interfaced with the host processor for processing data from the host processor and communicating the data to said frame buffer;

a marker register interfaced with the graphics pipeline for keeping track of said multiple contexts which traverse the pipeline; and pipeline bypass means bypassing the graphics pipeline, for providing direct access of data to the frame buffer and for reducing the amount of data passed from the host processor to the frame buffer through the graphics pipeline.

7. The system recited in claim 6 wherein the marker register means comprises a plurality of marker registers.

8. The system recited in claim 6 wherein the system further comprises a stopmarker register means interfaced with the pipeline bypass means for storing a predetermined value, the value being used for determining which of the multiple contexts are in the pipeline.

9. The system recited in claim 8 which the marker register means is automatically updated by a marker sent down the pipeline means between the host processor means and the frame buffer.

10. The system recited in claim 8 wherein the stopmarker register means is initiated through the pipeline bypass means between the host processor means and the frame buffer.

11. A method of tracking data commands in a computer graphics system having a pipeline and a frame buffer in order to eliminate pipeline flushing, said method comprising the steps of:

generating data commands and providing said data commands to said pipeline;

generating markers, wherein each of said markers has a marker value, and providing said markers to said pipeline so that a marker is provided between each of said data commands, wherein said markers traverse said pipeline;

establishing a stop marker value;

monitoring said pipeline at a predetermined pint in said pipeline by noting said marker values as said markers traverse said pipeline;

by determining whether a marker having a value equal to said stop marker value has passed said predetermined point by interrogating said noted marker values; and interrupting data flowing through said pipeline to said frame buffer in response to the interrogation of said noted marker values.

12. The method recited in claim 11 and for monitoring data commands further comprising the steps of:

positioning a marker register in said pipeline at said predetermined point;

recording in said marker register the value of markers passing said marker register;

checking the marker register at said predetermined point; and halting data commands into the frame buffer when, the value stored in said marker register equals said stop marker value.

13. The method recited in claim 12 wherein the step of generating markers comprises the step of:

incrementing the marker value by a preselected amount at the time each marker is generated.

14. The method recited in claim 13 wherein the pipeline system is used in a graphics window system.

15. The method recited in claim 14 wherein said stop marker value is stored in a stopmarker register.

16. The method recited in claim 15 wherein the data commands are graphics contexts.

* * * * *

UNITED STATES PATENT AND TRADEMARK OFFICE

CERTIFICATE OF CORRECTION

PATENT NO. : 5,224,210

DATED : June 29, 1993

INVENTOR(S) : David Pinedo, et al.

It is certified that error appears in the above-identified patent and that said Letters Patent is hereby corrected as shown below:

In claim 9, column 19, line 29, delete "which" and insert therefor --wherein--.

In claim 11, column 20, line 9, delete "pint" and insert therefor --point--.

Signed and Sealed this

Twenty-sixth Day of May, 1998

*Attest:*

Bruce Lehman

BRUCE LEHMAN

*Attesting Officer* *Commissioner of Patents and Trademarks*